(12) United States Patent
Roland

(10) Patent No.: US 7,331,445 B2
(45) Date of Patent: Feb. 19, 2008

(54) METHODS AND SYSTEMS TO FACILITATE SPIRAL CONVEYANCE

(75) Inventor: Bruce Roland, Hollister, CA (US)

(73) Assignee: Pride Conveyance, Hollister, CA (US)

( * ) Notice: Subject to any disclaimer, the term of this patent is extended or adjusted under 35 U.S.C. 154(b) by 0 days.

(21) Appl. No.: 10/993,755

(22) Filed: Nov. 19, 2004

(65) Prior Publication Data
US 2005/0109581 A1  May 26, 2005

Related U.S. Application Data

(60) Provisional application No. 60/524,194, filed on Nov. 20, 2003.

(51) Int. Cl.
*B65G 21/18* (2006.01)
(52) U.S. Cl. .................... 198/778; 198/833
(58) Field of Classification Search ........... 198/778, 198/833
See application file for complete search history.

(56) References Cited

U.S. PATENT DOCUMENTS

| | | | |
|---|---|---|---|
| 4,103,768 A | | 8/1978 | Persson |
| 4,262,797 A | * | 4/1981 | Schuricht et al. ........... 198/756 |
| 4,741,430 A | | 5/1988 | Roinestad |
| 4,850,475 A | | 7/1989 | Lupo et al. |
| 4,901,844 A | | 2/1990 | Palmaer et al. |
| 4,941,566 A | | 7/1990 | Irwin |
| 4,981,208 A | | 1/1991 | Jones |
| 5,105,934 A | | 4/1992 | Cawley |
| 5,191,267 A | * | 3/1993 | Machacek .................... 318/67 |
| 5,277,301 A | * | 1/1994 | Fenty .......................... 198/778 |
| 5,460,260 A | | 10/1995 | Ochs et al. |
| 5,833,045 A | * | 11/1998 | Osti et al. .................... 198/444 |
| 5,850,781 A | * | 12/1998 | Kuenen ..................... 99/443 C |
| 6,050,394 A | * | 4/2000 | Daringer et al. ............ 198/778 |
| 6,394,261 B1 | * | 5/2002 | DeGennaro .................. 198/815 |
| 6,523,677 B1 | | 2/2003 | DeGennaro et al. |
| 6,564,930 B1 | * | 5/2003 | Colding-Kristensen et al. .......................... 198/778 |
| 6,578,704 B1 | * | 6/2003 | MacLachlan ................ 198/778 |
| 6,695,128 B2 | * | 2/2004 | Palmaer et al. ............. 198/778 |
| 6,796,418 B1 | * | 9/2004 | Harrison et al. ............ 198/778 |

OTHER PUBLICATIONS

"Cheers: New Conveyors from Conveyor Systems Ltd, Swadlincote, Derbyshire, UK", *International Bottler & Packer*, 77(7), (Jul. 2003),22.

"CSL Spiral Conveyors Elevate Handling Capacity (Conveyor Systems Ltd.)", *Food Trade Review*, 4, (Apr. 1, 2002),225.

"Space Saving Spiral Conveyor Feeds Materials for Processing", *European Polymers Paint Colour Journal*, (May 26, 1993),260.

* cited by examiner

*Primary Examiner*—Joe Dillon, Jr.
(74) *Attorney, Agent, or Firm*—Schwegman, Lundberg & Woessner, P.A.

(57) ABSTRACT

According to a first aspect of the invention there is provided a conveyor system that includes a rotatably-mounted drum and a conveyor belt that is movable along a path that includes a helical portion around the drum. During movement of the conveyor belt, a surface of the drum frictionally engages an inside edge of the conveyor belt along the helical portion of the path. Finally, a peripheral surface of a rotating driving element directly engages the drum and to rotate the drum thereby operatively to move the conveyor belt along the path.

8 Claims, 15 Drawing Sheets

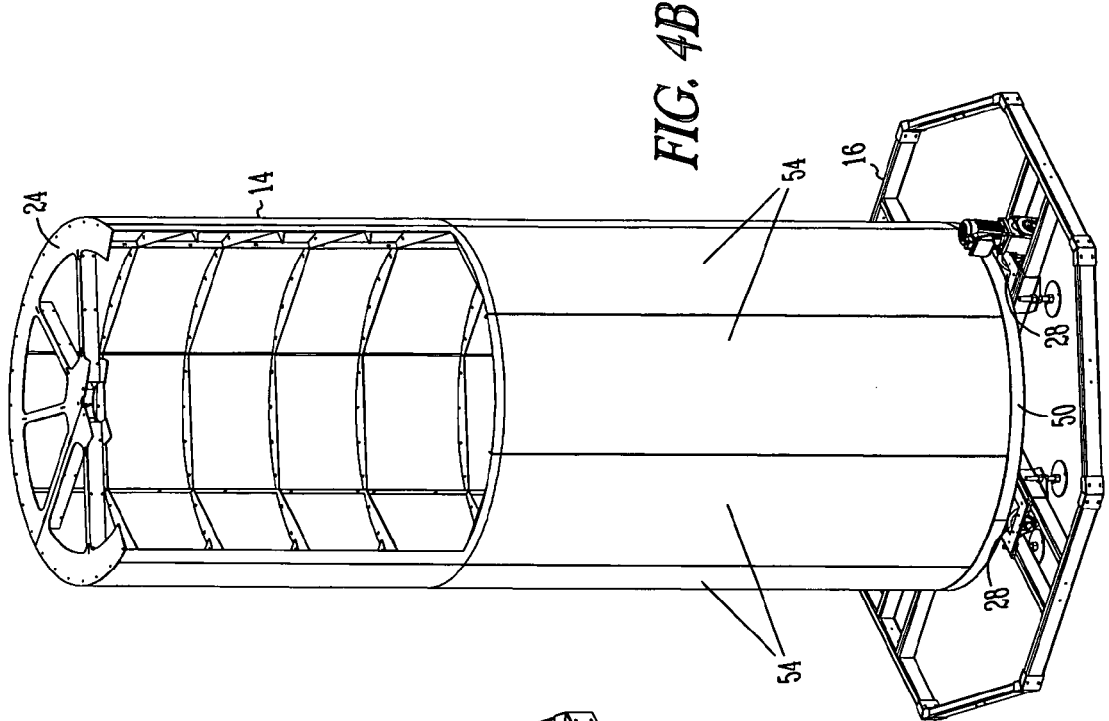
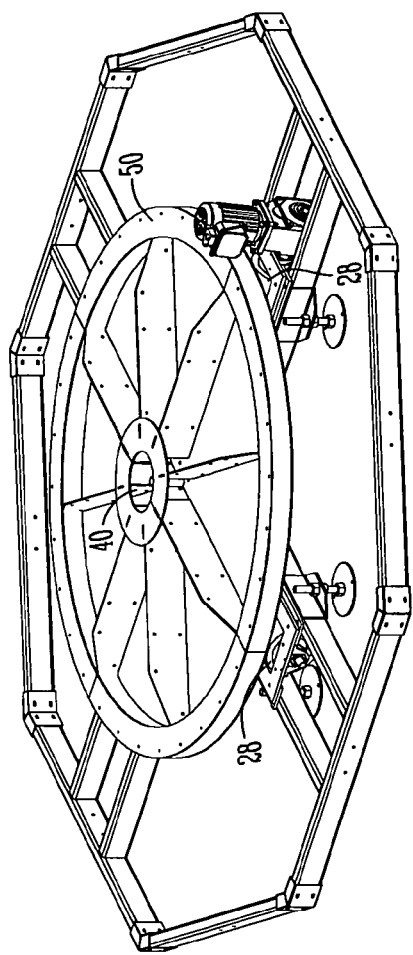
FIG. 4A
FIG. 4B

METHODS AND SYSTEMS TO FACILITATE SPIRAL CONVEYANCE

RELATED APPLICATIONS

This application claims the benefit of U.S. Provisional Application No. 60/524,194 filed on Nov. 20, 2003, which is incorporated herein by reference.

FIELD OF THE INVENTION

The present invention relates generally to the field of conveyer systems and, more specifically to capstan driven spiral conveyer systems.

BACKGROUND OF THE INVENTION

Capstan or low tension or drum spiral conveyors have been utilized in numerous industries for many years. Illustrated in FIG. 1 is a schematic diagram of a drum spiral conveyor 2, which is representative of those found in the prior art. The drum spiral conveyor 2 elevates or lowers items that rest on a conveyer belt that progress in a helical path around a drum. The conveyor belt is a closed loop that circulates up or down the drum over a conveyer bed that coils around the drum. The drum is usually driven by a chain that is driven by a gear motor and the belt is usually driven by a gear motor. The belt drive produces belt tension around the drum. The belt to drum frictional contact causes the belt to move up or down the helical slider bed in response to the drum slightly over-driving the belt speed. If the belt speed decreases relative to the drum speed, the belt may become slack on the drum thereby reducing the drum belt driving force. In contrast, an increase in the belt speed relative to the drum speed will increase the belt tension around the drum, which increases the drum belt driving force. As the conveyor belt moves along its path it carries items that rest upon the conveyor belt to a higher or lower level until the items exit the spiral conveyor at the desired destination. A number of operational problems are associated with driving the drum and detecting belt jams on the drum spiral conveyor.

SUMMARY OF THE INVENTION

According to a first aspect of the invention there is provided a conveyor system. The conveyor system includes a rotatably-mounted drum; a conveyor belt that is movable along a path that includes a helical portion around the drum, during movement of the conveyor belt a surface of the drum frictionally engages an inside edge of the conveyor belt along the helical portion of the path; and a rotating driving element, a peripheral surface of the rotating driving element to directly engage the drum and to rotate the drum thereby operatively to move the conveyor belt along the path.

According to a second aspect of the invention there is provided a conveyor system. The conveyor system includes a rotatably-mounted drum without a center shaft; a conveyor belt that is movable in a path that includes a helical portion around the drum, during movement of the conveyor belt a surface of the drum frictionally engages an inside edge of the conveyor belt along the helical portion of the path; and a rotating driving element to directly engage the drum and to rotate the drum, thereby operatively to move the conveyor belt along the path.

According to a third aspect of the invention there is provided a method to monitor belt slack in a drum spiral conveyor. The method includes automatically measuring a first quantity of belt slack at a first time and a second quantity of belt slack at a second time; computing a change in belt slack based on the first quantity of belt slack and the second quantity of belt slack; and detecting if the change in belt slack exceeds a threshold.

According to a fourth aspect of the invention there is provided a method to monitor belt slack in a drum spiral conveyor. The method includes automatically measuring a first quantity of belt slack after a drum spiral conveyor has started; establishing a mid point of a comparison window based on the first quantity of belt slack, the comparison window including an upper limit and a lower limit; automatically measuring a second quantity of belt slack; and detecting if the second quantity of belt slack exceeds at least one of the upper and lower limit.

BRIEF DESCRIPTION OF THE DRAWINGS

The present invention is illustrated by way of example and not limitation in the figures of the accompanying drawings, in which like references indicate similar elements and in which:

FIG. 4A shows a perspective view of a drum that is shaftless, according to one embodiment;

FIG. 4B shows component parts of the drum spiral conveyor, according to one embodiment;

DETAILED DESCRIPTION

Methods and systems to facilitate spiral conveyance are described. In the following description, for purposes of explanation, numerous specific details are set forth in order to provide a thorough understanding of the present invention. It will be evident, however, to one skilled in the art that the present invention may be practiced without these specific details.

Driving the drum in a drum spiral conveyor poses a number of operational problems in the prior art. For example, one approach utilizes sprocket segments welded to the perimeter of the drum that are driven with a drive chain. This approach is associated with a number of disadvantages. One disadvantage of this approach is that the horizontal orientation of the drive chain requires sufficient drive chain tension to counteract the force of gravity which tends to de-rail the chain from the sprocket segments. Maintaining the proper drive chain tension requires repeated manual tension adjustments or the use of an automatic chain take-up or tensioning system. A second disadvantage of this approach is that a person in the vicinity of the spiral drum conveyor must be cognizant of safety hazards created by pinch points where the chain engages the gear motor sprocket and the drum sprocket segments. A third disadvantage of this approach is that the external frame and drum must be constructed with sufficient strength to withstand the horizontal force necessary to drive the drum in a circular motion. To this end, the drum may require a center shaft and internal structure to support the drum and transmit the drive torque to the other parts of the drum. Another approach to driving the drum utilizes a chain driven drive sprocket that is located below or above the drum. This approach addresses the safety issue presented above; however, it may have the disadvantage of requiring a large reduction gearbox, which greatly increases the cost of the gear motor assembly. Further, this approach is associated with high maintenance costs because the large reduction gearbox is often difficult to access.

Figure 1:
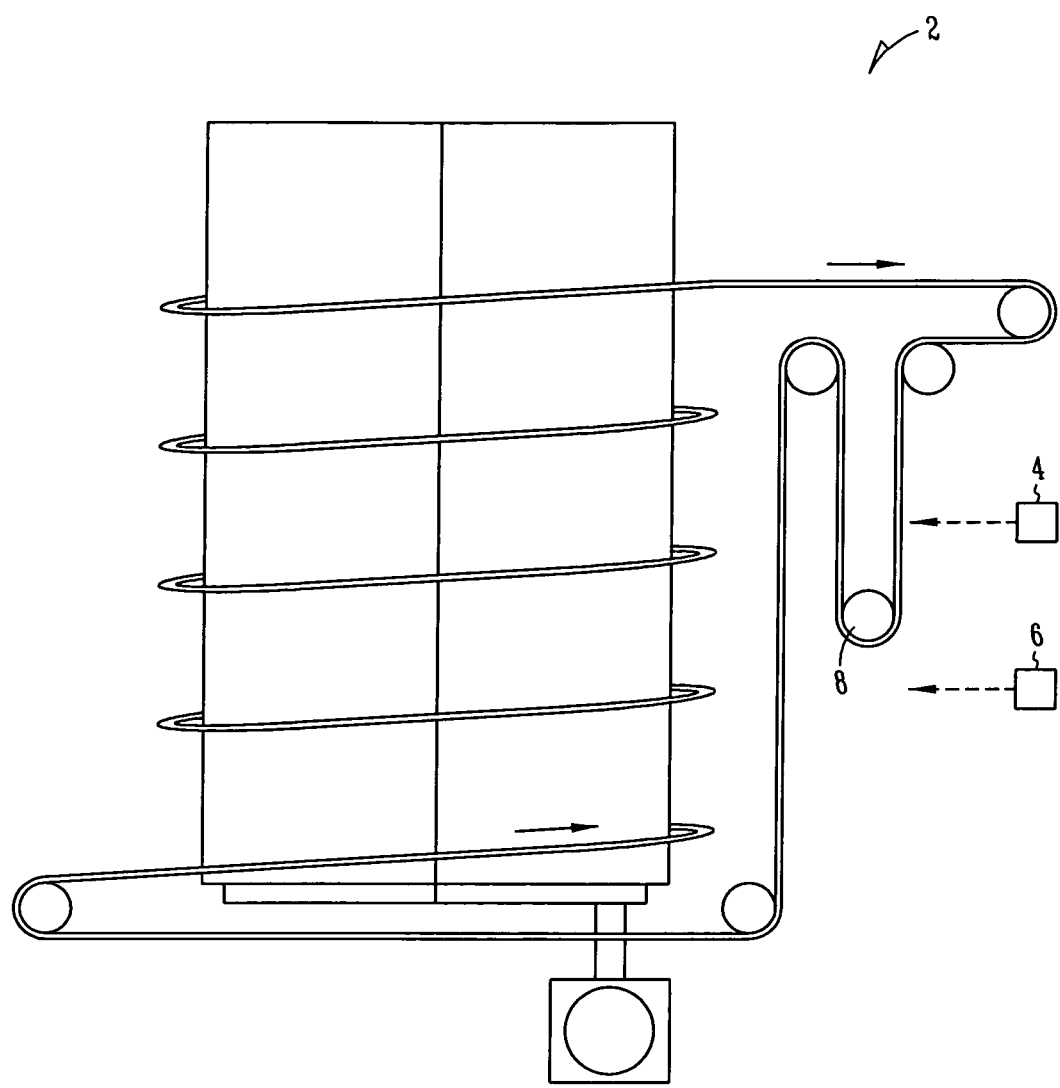
FIG. 1 is a side view of a drum spiral conveyor taken from the prior art.

Detecting and responding to belt jams in a drum spiral conveyor also pose operational problems. For example, FIG. 1 illustrates one approach utilized by the drum spiral conveyors 2 that are found in the prior art. The drum spiral conveyor 2 utilizes two sensing devices that are respectively positioned at an upper boundary 4 and a lower boundary 6. The sensing device positioned at the upper boundary 4 detects whether a take-up or tensioning roller 8, that moves up and down in response the available slack in the belt, crosses the upper boundary 4 and the sensing device positioned at the lower boundary 6 detects whether the take-up roller 8 crosses the lower boundary 6. Crossing a boundary indicates that belt movement has been disturbed (e.g., due to a mechanical drag, jam, etc.) thereby resulting in a belt crash (e.g., the belt has flipped up and no longer rests on the spiral conveyor bed). In response, the drum spiral conveyor shuts down to prevent the belt from breaking or flipping up in additional locations. This approach has a number of disadvantages. One disadvantage is that crashes are not prevented but merely identified. Attempts to prevent crashes have been made by lowering the upper boundary 4 and raising the lower boundary 6; however, such attempts tend to increase the number of false failures (e.g., the conveyor shuts down prematurely). Another disadvantage of defining upper and lower boundaries is that the boundaries may be set too far apart which may result in a broken belt. Defining the proper boundary settings is also complicated by changes in belt length due to natural causes. For example, the belt may lengthen over time due to natural wear or the belt may lengthen due to a rise in ambient temperature or the belt may shorten due to a fall in ambient temperature. Another approach to responding to belt jams in a drum spiral conveyor has been to install flip-up sensors on the conveyor bed that may detect a belt flip up and trigger the drum spiral conveyor to shut down.

According to one aspect of the present invention there is provided a conveyor system that utilizes the peripheral surfaces of rollers to frictionally engage the bottom surface of the drum. The rollers provide surfaces on which the weight of the drum rests and rotate to drive the drum, thereby operatively moving a conveyor belt in a spiral path.

According to a second aspect of the present invention there is provided a conveyor system with a drum that is shaftless.

According to a third aspect of the present invention there is provided a method to detect if the amount of slack in a conveyor belt for a drum spiral conveyor system exceeds an upper or lower limit. The method utilizes a sensing device that measures the amount of slack in a conveyor belt at a predetermined period after the drum spiral conveyor has started. The amount of measured slack is used to establish a midpoint of a comparison window that includes an upper limit and a lower limit. During normal operations the amount of slack in the conveyor belt is measured with the sensing device and compared against the upper limit and the lower limit. If the method detects that the amount of slack in the conveyor belt exceeds the upper limit or the lower limit then an action may be initiated.

According to a fourth aspect of the present invention there is provided a method to detect if a change in the amount of slack in a conveyor belt on a spiral conveyor system exceeds a threshold. The method utilizes a sensing device to measure the amount of slack in the conveyor belt. After a configurable period of time, the sensing device is again utilized to measure the amount of slack in the conveyor belt. A change in belt slack is computed. If the method detects a change in belt slack that exceed a threshold then an action may be initiated.

Figure 2:
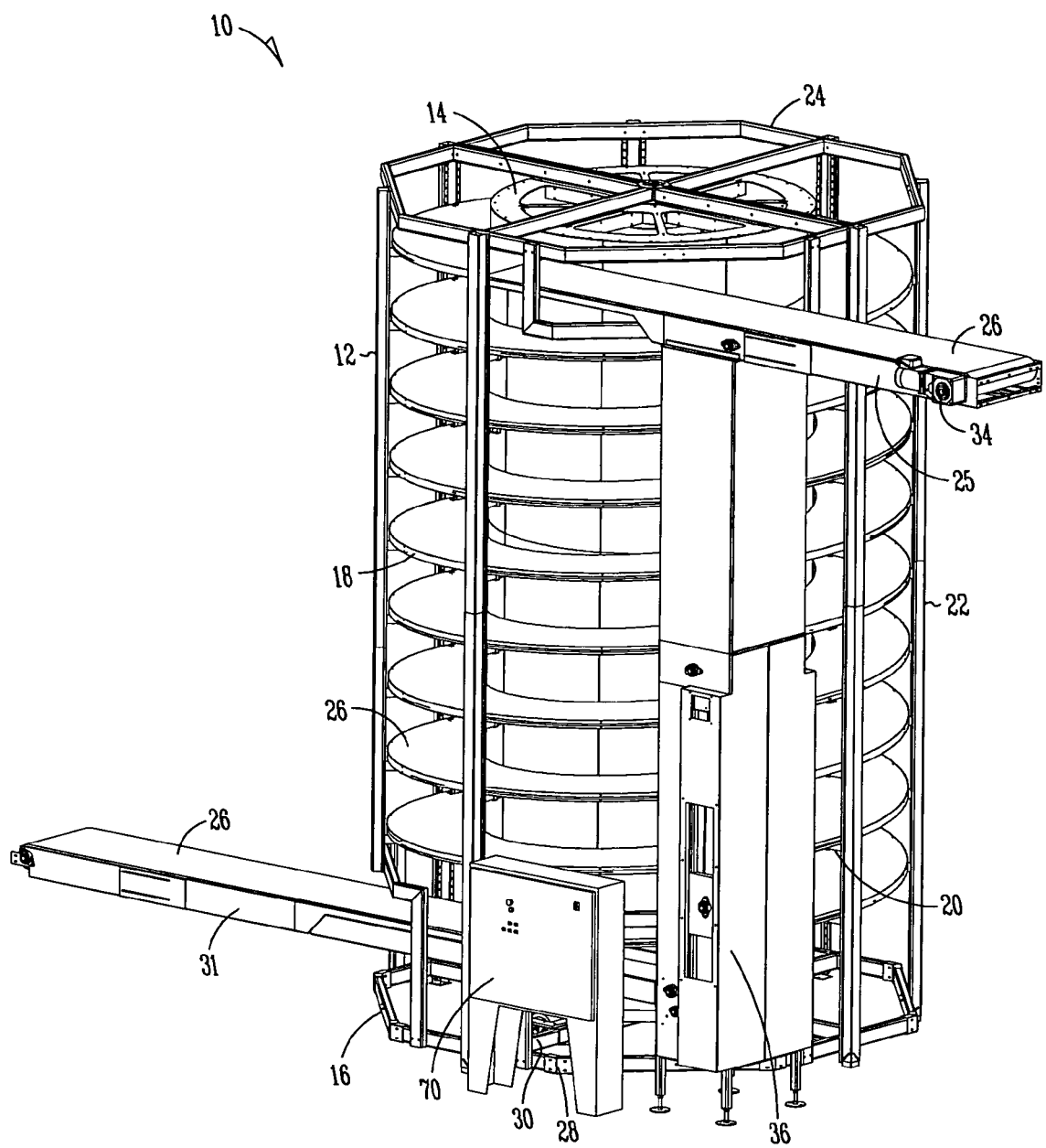
FIG. 2 shows a perspective view of a drum spiral conveyor, according to an exemplary embodiment of the invention.

FIG. 2 is a drawing illustrating a drum spiral conveyor 10, according to an exemplary embodiment of the invention. The drum spiral conveyor 10 includes of an external frame 12, a rotatably mounted drum 14, a conveyor belt 26, rotating driving elements in the form of rollers 28, a roller gear motor 30, a belt gear motor 34, a take-up or tensioning tower 36 and a control unit 70.

The external frame 12 includes a base frame 16, horizontal support bars 20, vertical support columns 22, and a top frame 24. The base frame 16 rests on a support surface (e.g., the ground) and is fastened to the vertical support columns 22 which, in turn, are fastened to the top frame 24. The horizontal support bars 20 support a helical slider bed 18 that commences at a lower tail section 31, then wraps or spirals around the drum 14, and exits into an upper belt drive section 25. A positive slope of the helical slider bed 18 elevates the belt 26 as it progresses. Each 360° traveled by the belt 26 may be referred to as a wrap. The vertical distance between wraps may be referred to as rise. For the elevating example, the upper belt drive section 25 is positioned to receive the belt tangentially from the drum 14.

The external frame 12 may be relatively light compared with external frames found in the prior art systems. Indeed, the external frame 12 (e.g., top frame 24, vertical support columns 22, horizontal tubes 20, and base frame 16) may be substantially stabilized by the drum 14 and may function to primarily support and stabilize the helical slider bed 18. This contrasts with external frames for drum driven spiral conveyer systems found in the prior art that must support the weight of the drum and the loads that are generated to rotate the drum.

The belt 26 wraps around the drum 14 and may be supported by the helical slider bed 18, as described above. An ascending belt 26 may exit the helical slider bed 18 onto the upper belt drive section 25 pass through a take-up tower 36 and return to the helical slider bed 18 via the lower tail section 31. The belt 26 is fed tangentially to the surface of the drum 14 by properly positioning the lower tail section 31. The belt 26 is endless and may be side-flexing. In addition, the belt 26 may be fabricated from any suitable material(s) (e.g., steel, plastics, etc.) and driven by the belt gear motor 34 that is positioned in the upper belt drive section 25 and controlled via the control unit 70. Other embodiments may drive the belt 26 by positioning the belt gear motor 34 in other locations along the path of the belt 26.

The take-up tower 36 may function as a belt reservoir to accommodate changes in the length of the belt 26. For example, the length of the belt 26 may increase with use (e.g., pin and link wear). Consequently, a belt 26 that is old may require the take-up tower 36 to store or retain a greater amount of belt 26 than a belt 26 that is new. In addition, the length of the belt 26 may also be affected by temperature. For example, the length of the belt 26 tends to increase in response to warmer temperatures and to decrease in response to cooler temperatures. Inasmuch as the spiral conveyor 10 may be utilized in summer/winter ambient conditions and warm or cool working environments (e.g., freezing, cooking, etc.) then the length of the belt 26 that is stored in the take-up tower 36 may be observed to change according to use. Thus, not only may the age of the belt 26 determine its length but also the working environment in which the drum spiral conveyor 10 is deployed. Also, the length of the belt 26 may vary during operation of the spiral conveyor 10 with regard to the amount of tension that is applied to the belt 26. For example, an increase in tension on the belt 26 may stretch the belt 26 which may minimize the length of belt 26 around the drum 14 and result in a greater quantity of the belt 26 in the take-up tower 36. Conversely, if tension on the belt 26 is reduced then additional belt may be removed from the take-up tower 36 to wrap around the drum 14. In addition, the amount of drum over-drive and product loading may effect belt tension. Thus, the tower 36 may release and hold portions of the belt 26 so that an appropriate portion of the belt 26 extends along the helical slider bed 18.

The drum 14 rotates on a vertical axis and frictionally engages the side of the belt 26. The drum 14 pushes the belt 26 and consequently tends to compress the belt as it rotates. The drum 14 may vary in diameter and height in different embodiments. In one embodiment the outside cylindrical surface of the drum 14 may be solid and defined by stainless steel panels. Other embodiments may utilize closely spaced bars to form the surface of the drum 14.

Rollers 28 may be positioned under the drum 14. The rollers 28 support the weight of the drum 14 and directly engage the bottom surface of the drum 14 to rotate the drum 14. Each roller 28 may be an idler roller or driven by a roller gear motor 30 that may be controlled by the control unit 70.

Exemplary Operation of Drum Spiral Conveyor

The drum spiral conveyor 10 generally operates as follows. The control unit 70 initially signals the roller gear motors 30 to drive the rollers 38, which in turn, drive the bottom surface of the drum 14 to rotate the drum 14. Next, the control unit 70 signals the belt gear motor 34 to pull the belt 26 taught thereby producing belt tension around the drum 14 that, in turn, causes the surface of the drum 14 to frictionally engage an inside edge of the belt 26. The frictional contact between the belt 26 and drum 14 may cause the belt 26 to move up or down the slider bed 18, depending on the direction of the rotation of the drum 14. The belt 26 moves as the drum 14 slightly overdrives the belt 26 (e.g., the belt 26 moves at a slower speed than the drum 14). If the belt gear motor 34 decreases belt speed, the belt 26 may become slack on the drum 14 thereby reducing the frictional contact between the drum 14 and the belt 26, which in turn, reduces the driving force of the drum 14. This may result in a reduction of the amount of belt in the take-up tower 36. On the other hand if the belt gear motor 34 increases belt speed, the belt 26 may become taught around the drum 14 thereby increasing the frictional contact between the drum 14 and the belt 26, which in turn, increases the driving force of the drum 14 and may result in an increase in the amount of belt in the take-up tower 36.

Figure 3A:
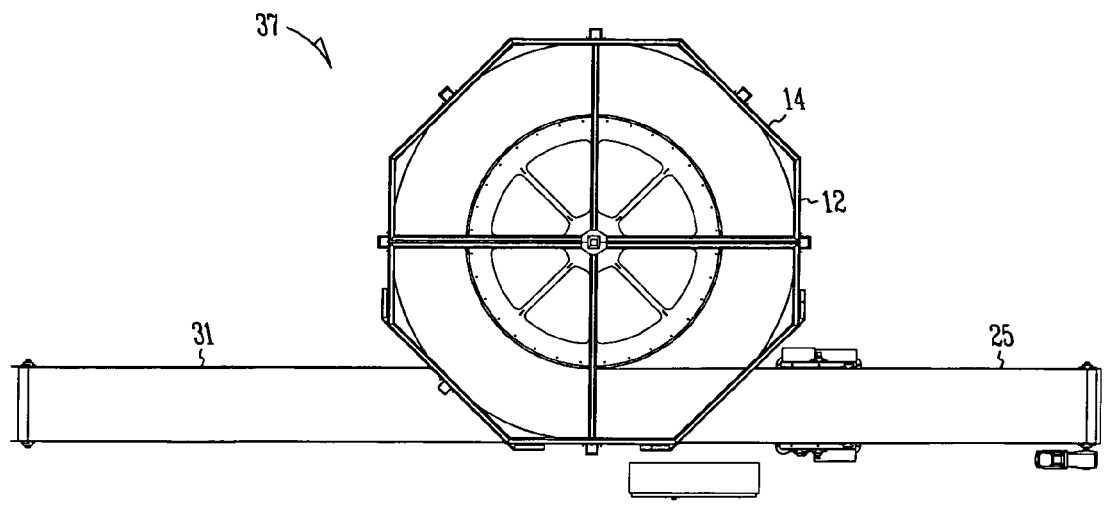
FIGS. 3A and 3B show top and side views of the drum spiral conveyor respectively, according to one exemplary embodiment.
Figure 3B:
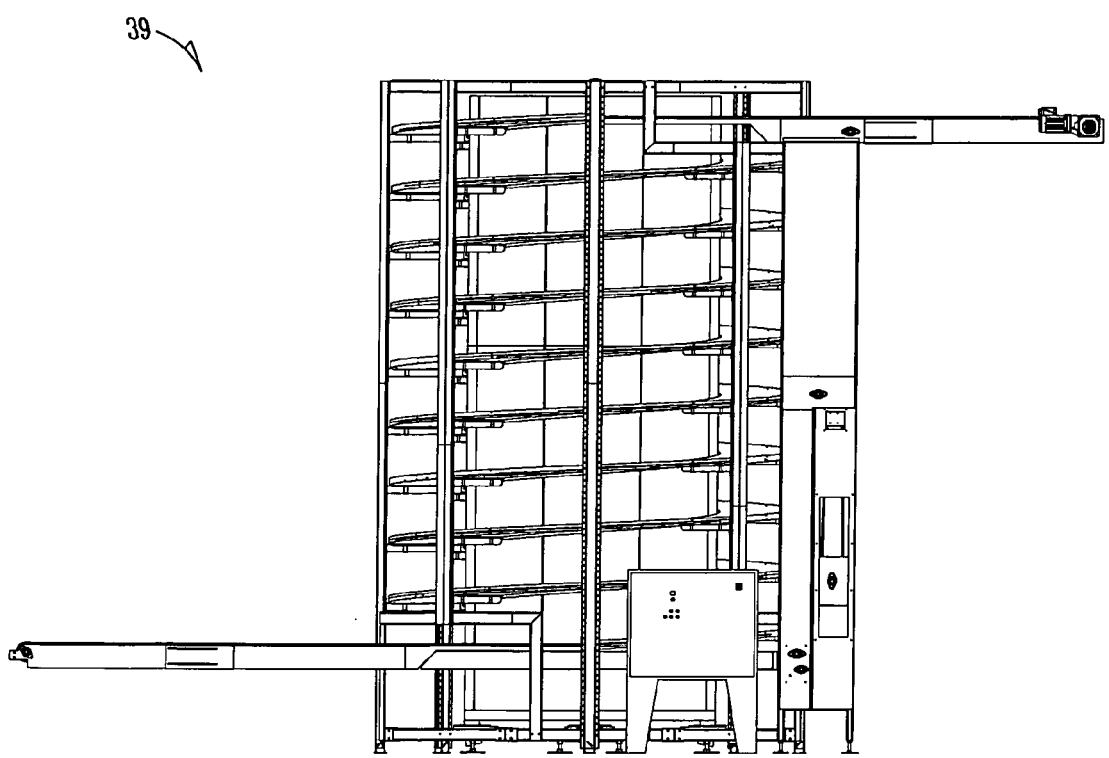

FIG. 3A shows a top view 37 and FIG. 3B show a side view 39 of the drum spiral conveyor 10, according to one embodiment. The top view 37 illustrates the upper belt drive section 25 and the lower tail section 31 as straight projections from the external frame 12 and the drum 14.

FIG. 4A illustrates an exemplary embodiment of the drum 14 with cut away drum panels. The drum 14 may be seated on a drum base 50 which, in turn, is seated on the lower base frame 16, according to one embodiment. One or more drum panels 54 may be bolted to the drum base 50 although other embodiments may utilize vertical bars in place of the drum panels 54. A top frame 24 holds the drum panels 54 in place. The drum 14 may be without a center shaft (e.g., shaftless), as may be viewed in the upper portion of the drum 14 where the drum panels 54 are illustrated as cut away. In contrast, drums found in the prior art require a center shaft that extends axially through the drum as well as other supporting structure. For example, drums in the prior art require significant inner structure, a center shaft, and bearings at the top and bottom. The bearings must be mounted to a fixed external frame with sufficient integrity to hold the vertical orientation of the drum. Further, drum spiral conveyors in the prior art require an external frame of sufficient integrity to absorb the horizontal load required to keep the drum vertical. In contrast, the shaftless drum 14 is held in a vertical position by rollers 28 which are supported by the support surface or floor with structural loading that is perpendicular to the floor and with reduced horizontal loads imparted to the external frame.

FIG. 4B illustrates a shaftless drum base 50 mounted on top of a centering stub shaft 40 with bearings that provide a positive means of fixing the center of rotation for the drum 14, according to one embodiment.

Figure 5A:
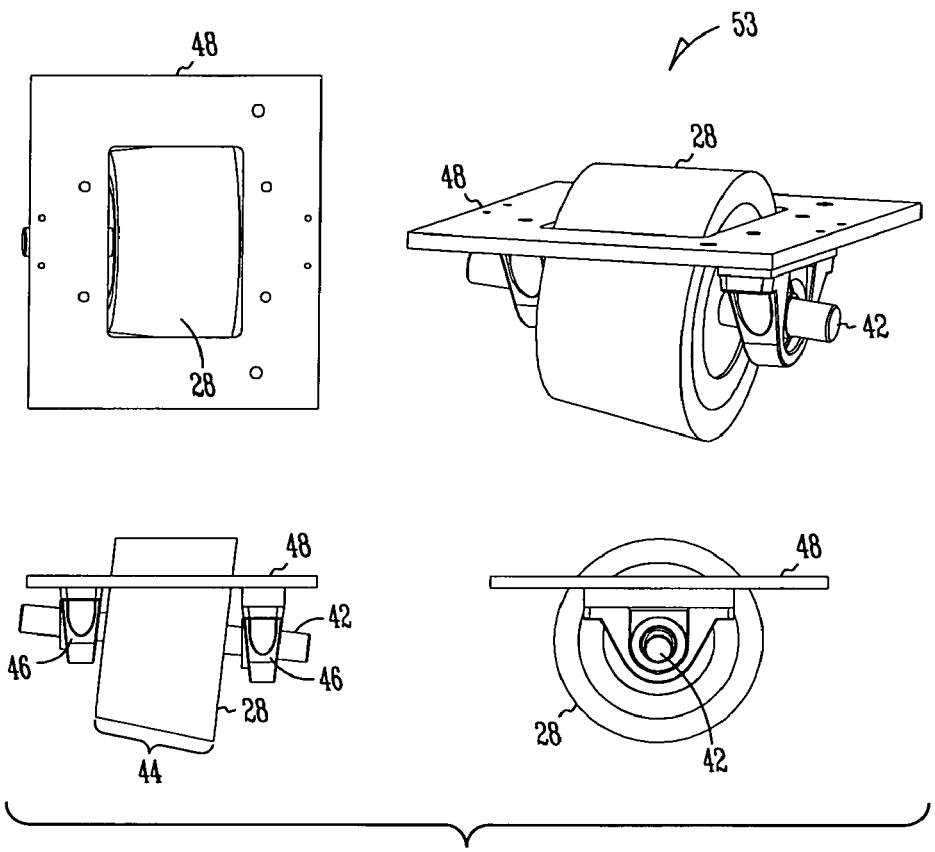
FIGS. 5A, 5B and 5C show a roller assembly, according to one embodiment.

FIG. 5A illustrates a roller assembly 53, according to one embodiment. The roller assembly 53 may include the roller 28, a shaft 42, roller bearings 46, a roller mounting plate 48 and an optional roller gear motor 30. The roller 28 may be centered on the shaft 42 with roller bearings 46 of a pillow block style. The roller bearings 46, in turn, mount to the roller mounting plate 48. Each roller assembly 53 may include a roller gear motor 30 that may drive the respective roller 28, according to an embodiment. The roller gear motor 30 may be controlled via the control unit 70. One embodiment utilizes a hollow shaft gear motor to drive the roller 28. Another embodiment may utilize a conventional sprocket and chain drive to drive the roller.

FIG. 5A further illustrates the roller 28 with a taper 44, according to one embodiment. The roller 28 includes the taper 44 to maintain the same instantaneous velocity at all contact points between the peripheral surface of the roller and the bottom surface of the drum 14. The specific amount of taper 44 corresponds to a diameter of the drum 14 and may be computed to maximize the contact between the roller 28 and the bottom surface of the drum 14. An exact diameter may be required at each end of the roller 28 to reduce wear on a (non-driven) roller 28 that is idle (e.g., a roller that is not driven by the roller gear motor 30) and to prevent skidding and/or maximize drive friction on a roller 28 that is utilized to drive (e.g., a roller that is driven by the roller gear motor 30) the bottom surface of the drum 14.

Figure 5B:
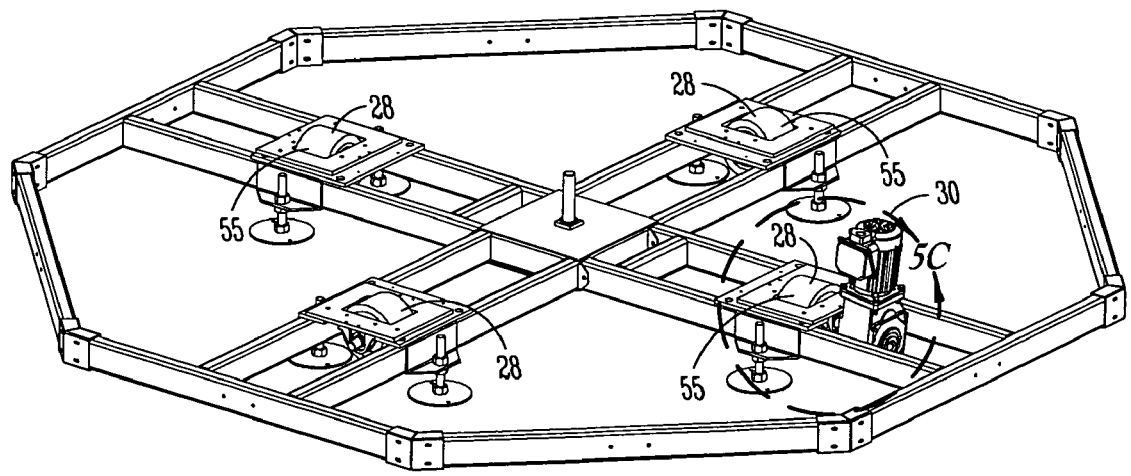
Figure 5C:
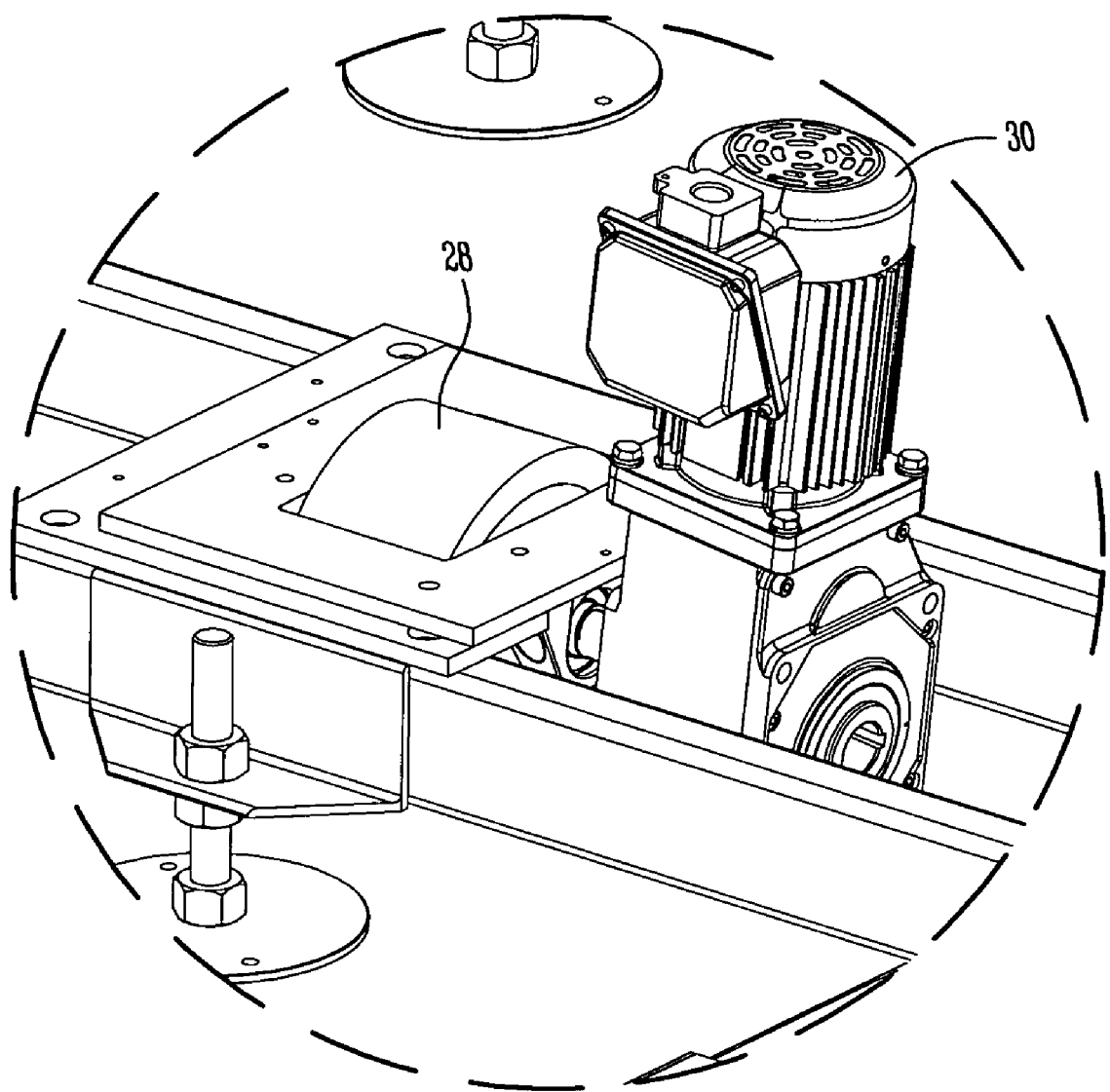

FIG. 5B illustrates the roller 28 as positioned to drive the bottom surface of the drum 14, according to one embodiment. The roller 28 includes a peripheral surface 55 (e.g., outside surface) that frictionally engages the bottom surface of the drum 14 to rotate the shaftless drum 14. Other embodiments may utilize the peripheral surface 55 of a sprocket or some other rotating driving element. For example, a sprocket may utilize a mesh to engage a surface of the shaftless drum 14. The peripheral surface of the roller 28 or sprocket may be contrasted with mechanisms found in the prior art that utilize an inside surface to pull a drum (e.g., a chain). It will be appreciated that other embodiments may utilize the roller 28 to drive other surfaces of the drum (e.g., outside top surface, outside cylinder surface, inside bottom surface, inside top surface, inside cylinder surface, etc.).

The roller 28 may be fabricated out of steel. The outer surface of the roller 28 may be vulcanized with polyurethane for greater friction with the drum 14, although other embodiments may utilize other materials for fabrication and drum engagement.

One potential advantage of driving the shaftless drum 14 with the roller 28 is the mitigation of the need for a special, heavy and/or costly "large ratio" gear motor. For example, the diameter of the roller relative to the diameter of the drum 14 provides a large ratio (e.g., many revolutions of each roller per single revolution of the drum) that enables the use of a gear motor with a gear motor ratio that is used in straight running mechanical conveyor applications. Thus, in one exemplary embodiment, a direct benefit in the form of economical and readily available gear motors may be realized by utilizing the roller(s) 28 to drive the drum.

Figure 5D:
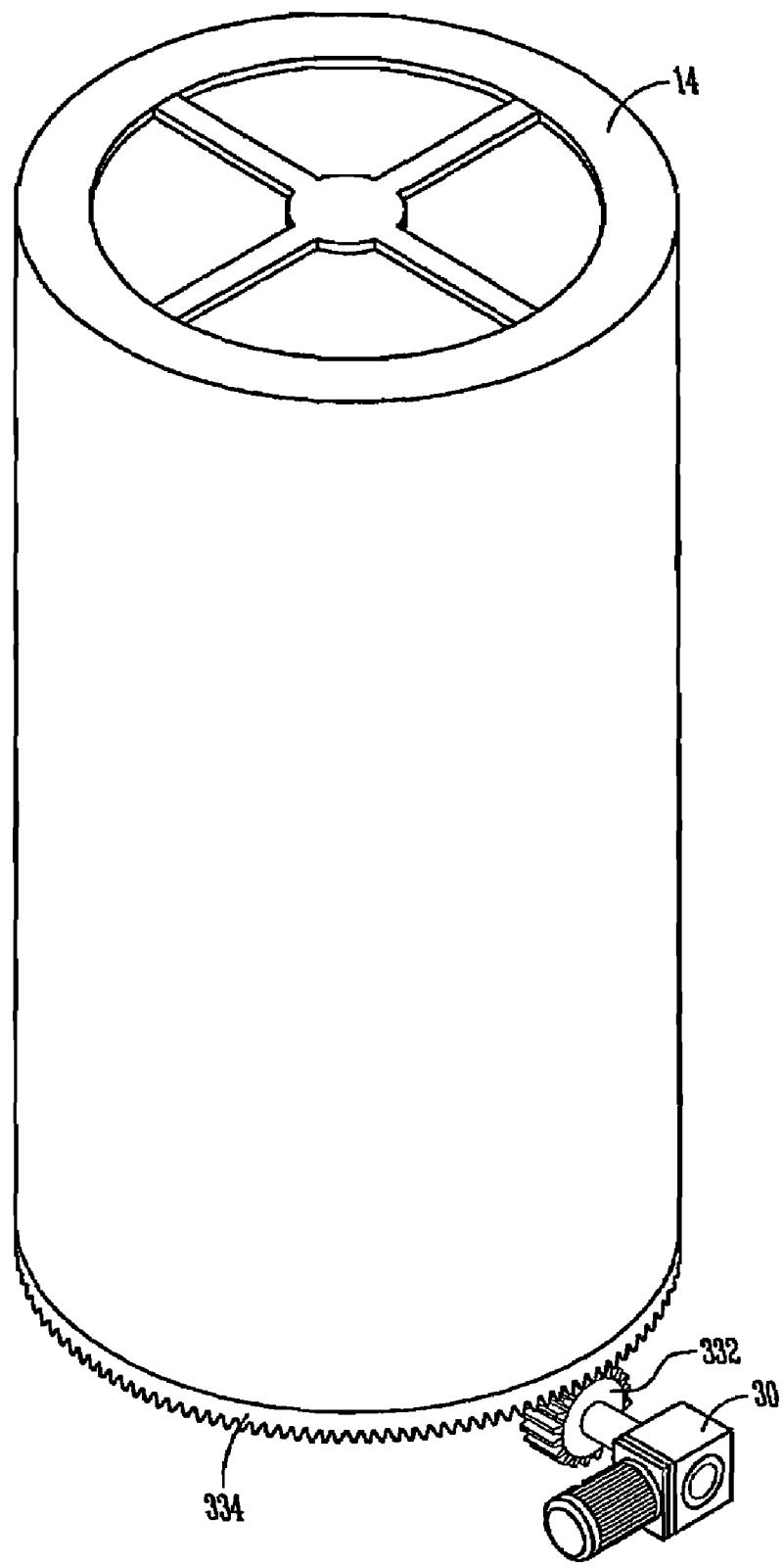
FIG. 5D shows a rotating driving element that includes a sprocket, according to exemplary embodiment.

FIG. 5D illustrates a rotating driving element that includes a sprocket 332 driven by a roller gear motor 30, according to one embodiment. The sprocket 332 is further shown to directly engage the drum with a meshed engagement 332.

Figure 5E:
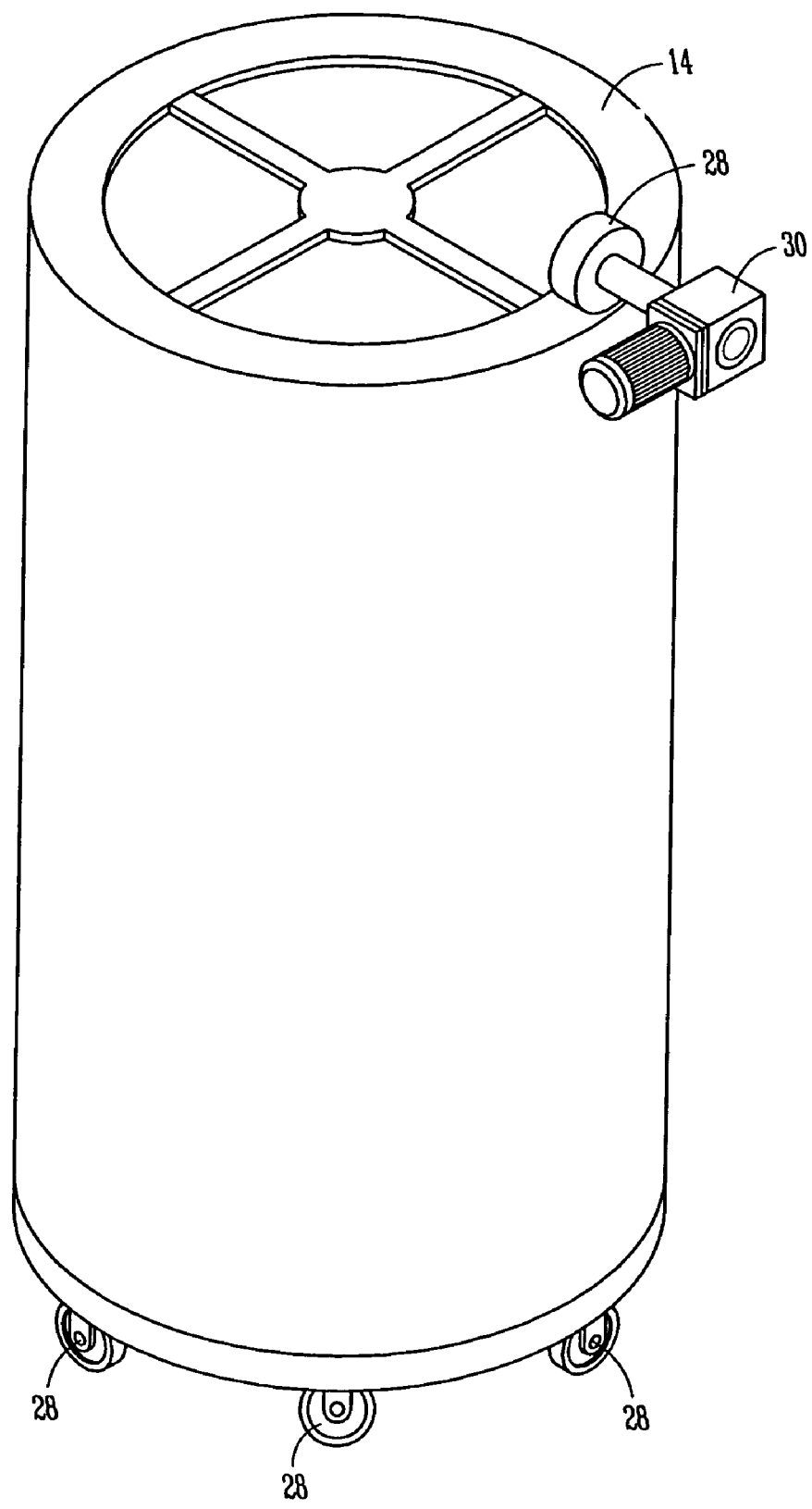
FIG. 5E shows a rotating driving element directly engaging an outside top surface of a drum, according to exemplary embodiment.

FIG. 5E illustrates a rotating driving element directly engaging an outside top surface of a drum, according to one embodiment. The rotating driving element includes a roller 28 driven by a roller gear motor 30. Also illustrated are idler rollers supporting the bottom of the drum 14.

Figure 5F:
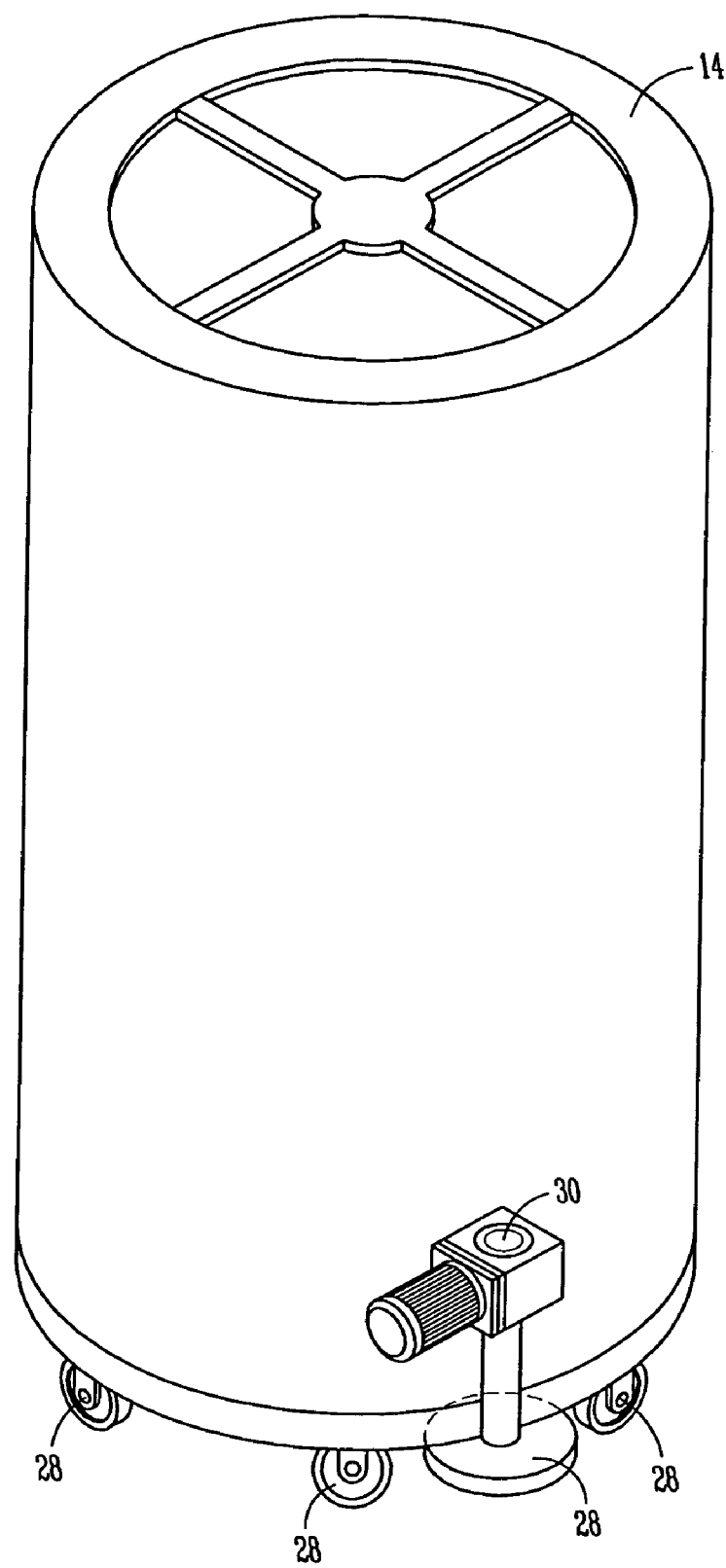
FIG. 5F shows a rotating driving element directly engaging an outside cylindrical surface of a drum, according to exemplary embodiment.

FIG. 5F illustrates a rotating driving element directly engaging an outside cylindrical surface of a drum 14, according to one embodiment. The rotating driving element includes a roller 28 driven by a roller gear motor 30. Also illustrated are idler rollers supporting the bottom of the drum 14.

Thus, broadly, a shaftless drum for a spiral drum conveyor may be driven by the surface of a roller thereby obviating the need to utilize a chain to drive the drum. Advantages of this approach may include elimination of maintenance costs associated with a chain (e.g., ensuring proper chain tension), increased safety due to pinch points caused by a chain, elimination of the shaft of the drum, elimination of substantial portions of the inner supporting structure of the drum, and elimination of a costly gearbox.

Figure 6:
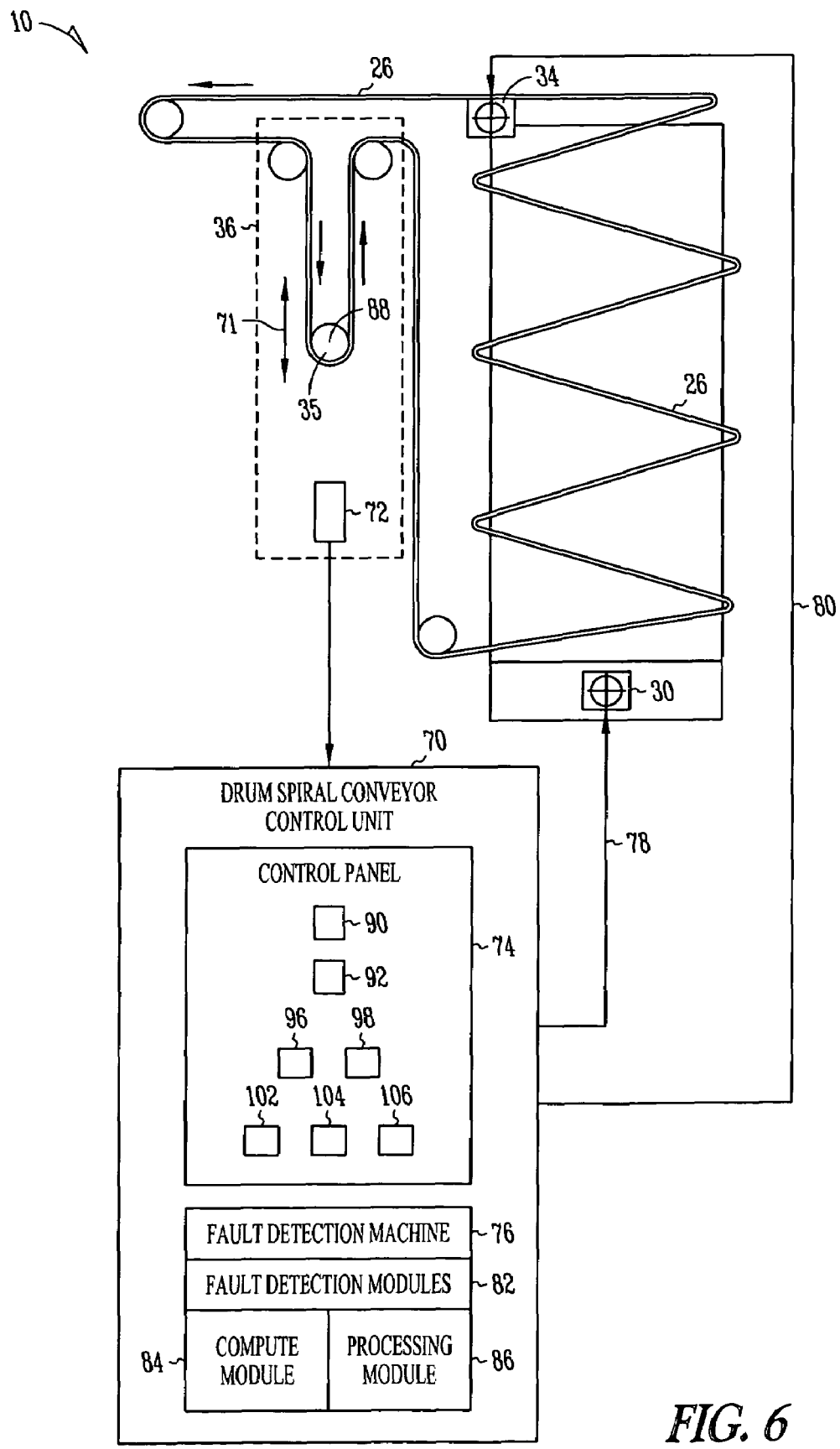
FIG. 6 is a block diagram illustrating a drum spiral conveyor and control unit, according to one embodiment.

FIG. 6 is a block diagram illustrating a drum spiral conveyor 10 in relation to a control unit 70, according to one exemplary embodiment. The control unit 70 includes a control panel 74 and a fault detection machine 76. In one exemplary embodiment the fault detection machine 76 is a computer that receives communications from a sensor 72, processes the communications with fault detection module(s) 82 and responds to a detected fault by speeding up or slowing down a roller gear motor 30, speeding up or slowing down a belt gear motor 34, or stopping the drum spiral conveyor 10. The fault detection module(s) 82 include a compute module 84 and a processing module 86.

The sensor 72 may utilize laser technology to continuously detect the position of a take-up roller 35. The sensor 72 includes a laser that emits a laser (or light) beam which bounces off reflector tape 88 that is attached to the take-up roller and is sensed by the sensor 72. For example, one embodiment may include the Banner Laser Distance Eye, manufactured by Banner Engineering Corporation of Minneapolis, Minn. Other embodiments may utilize sonic, LED, mechanical spring loaded wire/encoder, photoelectric or another technology to measure the position of the take-up roller 35.

The control panel 74 includes, for example, an emergency stop button 90 to make an emergency stop of the drum spiral conveyor 10, a reset button 92 to reset the drum spiral conveyor 10, start button 96, a stop button 98, a manual drum jog 102, a manual/automatic selector 104 to manually or automatically operate the drum spiral conveyor 10, and a manual belt jog 106.

Exemplary Measuring of the Position of the Take-Up Roller

The control unit 70 utilizes the sensor 72 to monitor the position of a take-up roller 35 in the take-up tower 36. An arrow 71 illustrates that the take-up roller 35 may elevate or lower depending on the amount of slack in a belt 26. An increase in slack in the belt may cause the take-up roller 35 to lower (e.g., the amount of belt entering the take-up tower 36 is greater than the amount of belt leaving the take-up tower 36). On the other hand, a decrease in slack in the belt 26 may cause the take-up roller 35 to elevate or rise (e.g., the amount of belt entering the take-up tower 36 is less than the amount of belt leaving the take-up tower 36). An increase in slack may be caused by starting the drum spiral conveyor 10, normal belt wear, a temperature increase, etc. A decrease in slack may be caused by starting the drum spiral conveyor 10, a temperature decrease, etc. An increase or decrease in slack may also be caused by sudden jamming of the belt, overloading of the belt, etc.

Figure 7:
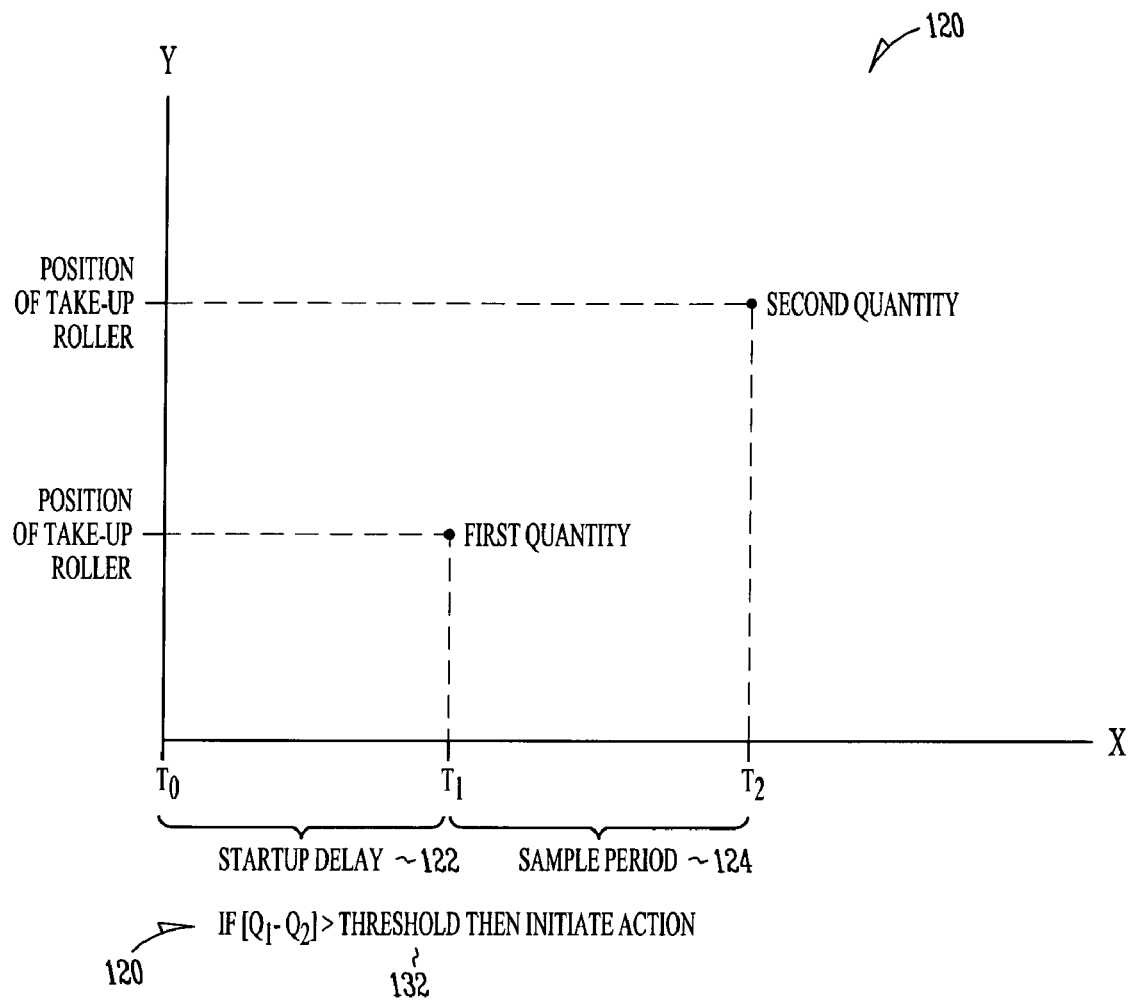
FIG. 7 is a diagram illustrating a method to detect if a change in belt slack on a spiral drum conveyor exceeds a threshold, according to one embodiment.

FIG. 7 is a diagram illustrating a method 120, according to one embodiment, to detect if a change in belt slack on a spiral drum conveyor exceeds a threshold. The method 120 is illustrated by means of a Cartesian plane with an x axis corresponding to time and a y axis corresponding to the position of the take-up roller 35 (e.g., slack in belt). The x axis identifies two configurable periods of time including a startup delay 122 and a sample period 124. The startup delay 122 is a period that must expire before utilizing the sensor 72 to measure a first quantity that quantifies the position of the take-up roller 35. The sample period 124 is the amount of time that must elapse between measuring the first quantity and a second quantity. The method 120 is utilized to compute a change in the belt slack based on the first quantity of belt slack and the second quantity of belt slack. Note that an absolute value of the change in belt slack is computed as denoted by the brackets. Thus, a positive or negative change in belt slack (e.g., a rising or falling slope) may be compared with a threshold 132 to determine if the change in belt slack exceeds a threshold for the configured sample period 124.

Figure 8:
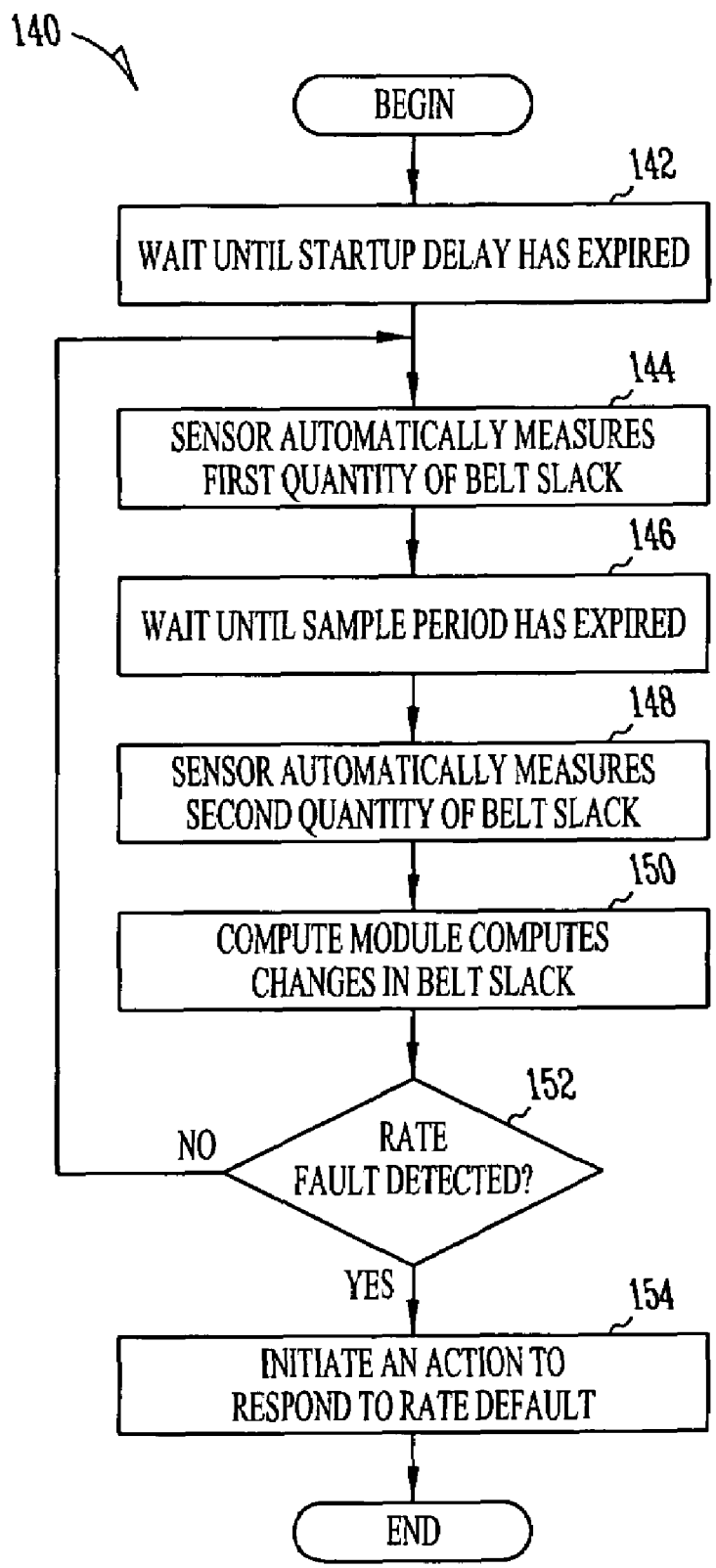
FIG. 8 is a block diagram illustrating a method to detect if a change in belt slack on a spiral drum conveyor exceeds a threshold, according to one embodiment.

FIG. 8 is a block diagram illustrating a method 140, according to one embodiment, to detect if a change in belt slack on a spiral drum conveyor exceeds a threshold. Referring to FIG. 7 and FIG. 8 the method 140 commences at operation 142 where the fault detection machine 76 waits until the startup delay 122 has expired. The startup delay 122 is a configurable value and may be adjusted to accommodate changes in the configuration of the drum spiral conveyor 10 (e.g., adding or removing wraps, changing belts, reversing direction, etc.).

At operation 144, the fault detection machine 76 signals the sensor 72 to automatically measure a first quantity of belt slack by sensing the position of the take-up roller 35. Next, the sensor 72 communicates the first quantity to the compute module 84 at the fault detection machine 76. At the fault detection machine 76, the compute module 84 stores the first quantity in a register.

At operation 146, the fault detection machine 76 waits until the sample period 124 has elapsed. The sample period 124 is a configurable value and may be adjusted to detect various conditions that are exhibited by the drum spiral conveyor 10.

At operation 148, the fault detection machine 76 signals the sensor 72 to automatically measure a second quantity of belt slack by sensing the position of the take-up roller 35. Next, the sensor 72 communicates the second quantity to the compute module 84 at fault detection machine 76. At the fault machine 76, the compute module 84 stores the second quantity in a register.

At operation 150, the compute module 84 computes a change in belt slack. The compute module 84 computes the change in belt slack by subtracting the second quantity from the first quantity and taking the absolute value of the result.

At decision operation 152, the processing module 86 detects if the absolute value of the change in belt slack is greater than a configurable threshold 132. If the absolute value of the change in belt slack is greater than the configurable threshold 132 then a branch is made to operation 154. Otherwise a branch is made to operation 144.

At operation 154, the processing module 86 initiates an action. For example, the processing module 86 may stop the drum spiral conveyor 10 by stopping the belt gear motor 34 and the roller gear motors 30. In another embodiment the processing module 86 may adjust the ratio of the speeds of the belt gear motor 34 to the roller gear motors 30. Indeed, the speeds of the belt gear motor 34 and the roller gear motors 30 may be respectively increased or decreased to appropriately respond. It will also be appreciated that multiple thresholds 132 may be processed concurrently; each threshold 132 associated with a corresponding sample period 124 and a corresponding action. For example, the threshold 132 may be low and the sample period 174 may be short to detect a sudden jam or stopping condition. In response to this condition, the processing module 86 may stop the belt gear motor 34 and the roller gear motors 30 to prevent the belt 26 from flipping up (e.g. a crash) and damaging products. In addition, a second threshold 132 may be high and the corresponding sample period 124 may be long to detect a slow overloading condition or an unfavorable overloading of the belt 26. In response to these conditions, the processing module 86 may increase the drum speed by increasing the roller gear motors 33 until a maximum overdrive speed is reached. Indeed, the fault detection machine 76 enables continuous monitoring of the take-up roller 35 to acquire information that is used to characterize various conditions on the drum spiral conveyor 10. The acquired information may subsequently be used to configure an appropriate threshold 132, sample period 124, and action.

Thus, broadly speaking a method to detect if a change in belt slack on a spiral drum conveyor 10 exceeds a threshold has been described. Advantages of this approach may include detecting an unfavorable condition before a belt crash occurs, elimination of flip-up sensors on the helical slider bed 18 because a unfavorable condition is detected before a belt crash occurs, and acquiring information to configure various sets of thresholds 132, sample periods 174 and actions to detect and mitigate or eliminate operational problems.

Figure 9:
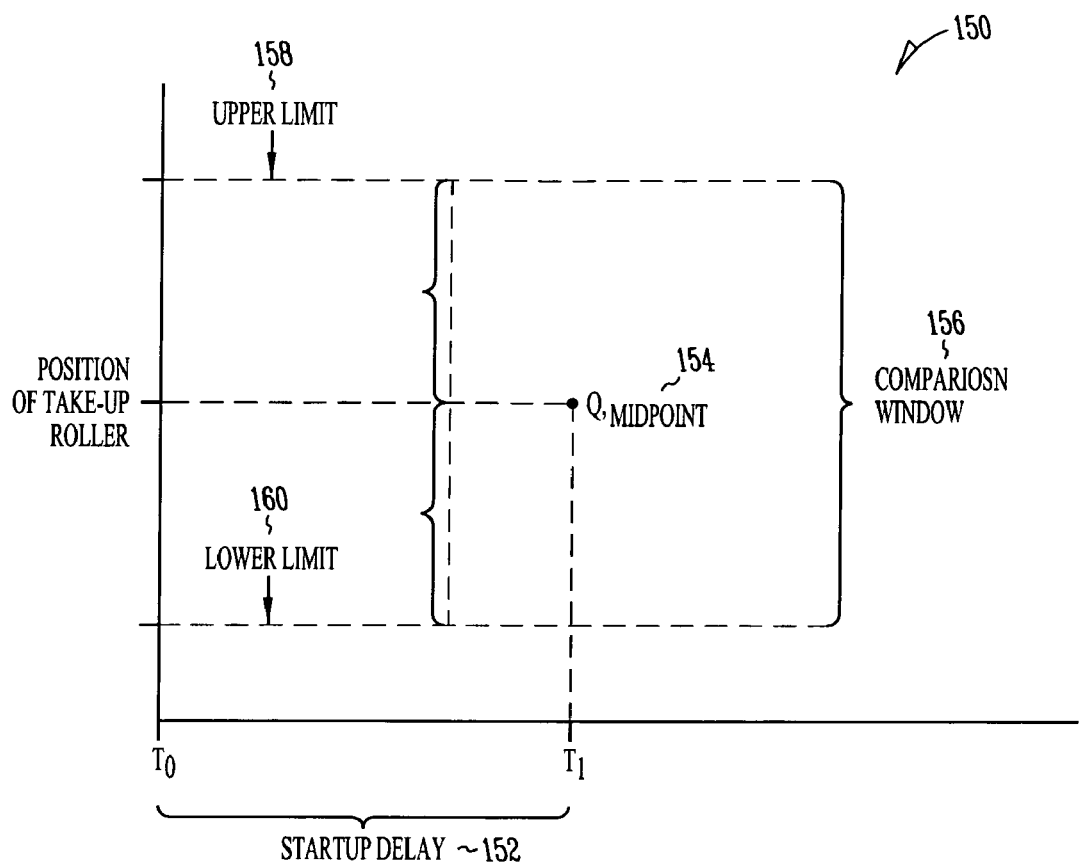
FIG. 9 is a diagram illustrating a method to detect if belt slack on a spiral drum conveyor exceeds at least one of an upper and lower limit, according to one embodiment.

FIG. 9 is a diagram illustrating a method 150, according to one exemplary embodiment, to detect if belt slack on a spiral drum conveyor exceeds an upper or lower limit. The method 150 is illustrated by means of a Cartesian plane with an x axis corresponding to time and a y axis corresponding to the position of the take-up roller 35 (e.g., slack in belt). The x axis includes a startup delay 152 which may be a configurable period of time. The startup delay 152 is a period that must expire before utilizing the sensor 72 to measure a position of the take-up roller 35 that will be utilized to establish a midpoint 154 of a comparison window 156. Extending a configurable distance from the midpoint 154 is an upper limit 158 and a lower limit 160. During normal run operations, the method 150 is utilized to detect if the belt slack, as measured with the sensor 72, is greater than the upper limit 158 or less than the lower limit 160.

Figure 10:
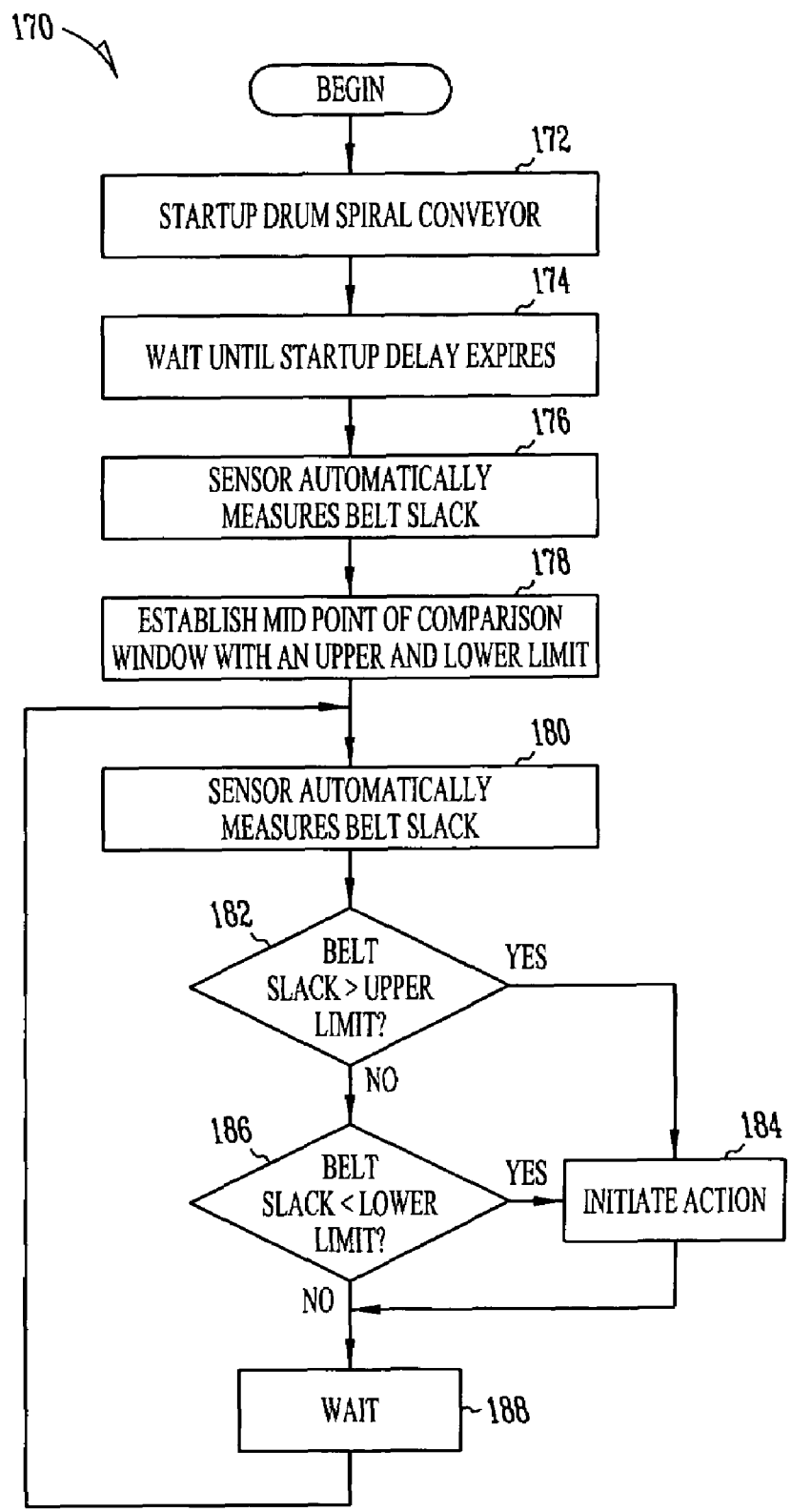
FIG. 10 is a block diagram illustrating a method to detect if belt slack on a spiral drum conveyor exceeds at least one of an upper limit and lower limit, according to one exemplary embodiment.

FIG. 10 is a block diagram illustrating a method 170, according to one embodiment, to detect if belt slack on a spiral drum conveyor (e.g., the drum conveyor 10) exceeds an upper or lower limit. Referring to FIGS. 9 and 10 the method 170 commences at operation 172 where the drum spiral conveyor 10 starts.

At operation 174, the fault detection machine 76 waits until the startup delay 152 has expired. The startup delay 152 is a configurable value and may be adjusted to accommodate changes in the configuration of the drum spiral conveyor 10 (e.g., adding or removing wraps, changing belts, reversing direction, etc.).

At operation 176, the fault detection machine 76 signals the sensor 72 to automatically measure a first quantity of belt slack by sensing the position of the take-up roller 35. Next, the sensor 72 communicates the first quantity to the compute module 84 at fault detection machine 76. At the fault detection machine 76, the compute module 84 stores the first quantity in a register.

At operation 178, the compute module 84 establishes the midpoint 154 of the comparison window 154 based on the first quantity and computes an upper limit 158 and a lower limit 160 by adding respective configurable values to the midpoint 154.

At operation 180, the fault detection machine 76 signals the sensor 72 to automatically measure a second quantity of belt slack by sensing the position of the take-up roller 35. Next, the sensor 72 communicates the second quantity to the compute module 84 at the fault detection machine 76. At the fault machine 76, the compute module 84 stores the second quantity 128 in a register.

At decision operation 182, the processing module 86 detects if the second quantity is greater than the upper limit 158. If the second quantity is greater than the upper limit 158 then a branch is made to operation 184. Otherwise a branch is made to decision operation 186.

At decision operation 186, the processing module 86 determines if the second quantity is less than the lower limit 160. If the second quantity is less than the lower limit 160 then a branch is made to operation 184. Otherwise a branch is made to operation 186.

At operation 184, the processing module 86 initiates an action and processing continues at operation 188. For example, the processing module 86 may stop the drum spiral conveyor 10 by stopping the belt gear motor 34 and the roller gear motors 30. In another embodiment the processing module 86 may initiate an action to recover, as described above.

At operation 188, the fault detection machine 76 waits a configurable period of time.

Thus, broadly speaking a method to detect if belt slack on a spiral drum conveyor exceeds an upper or lower limit has been described. Advantages of this approach may include detecting that a limit has been exceeded before a belt crash occurs, elimination of flip-up sensors on the helical slider bed 18 because a unfavorable condition is detected before a belt crash occurs, and automatically establishing and utilizing upper and lower limits to filter out changes in belt length that are naturally caused.

Figure 11:
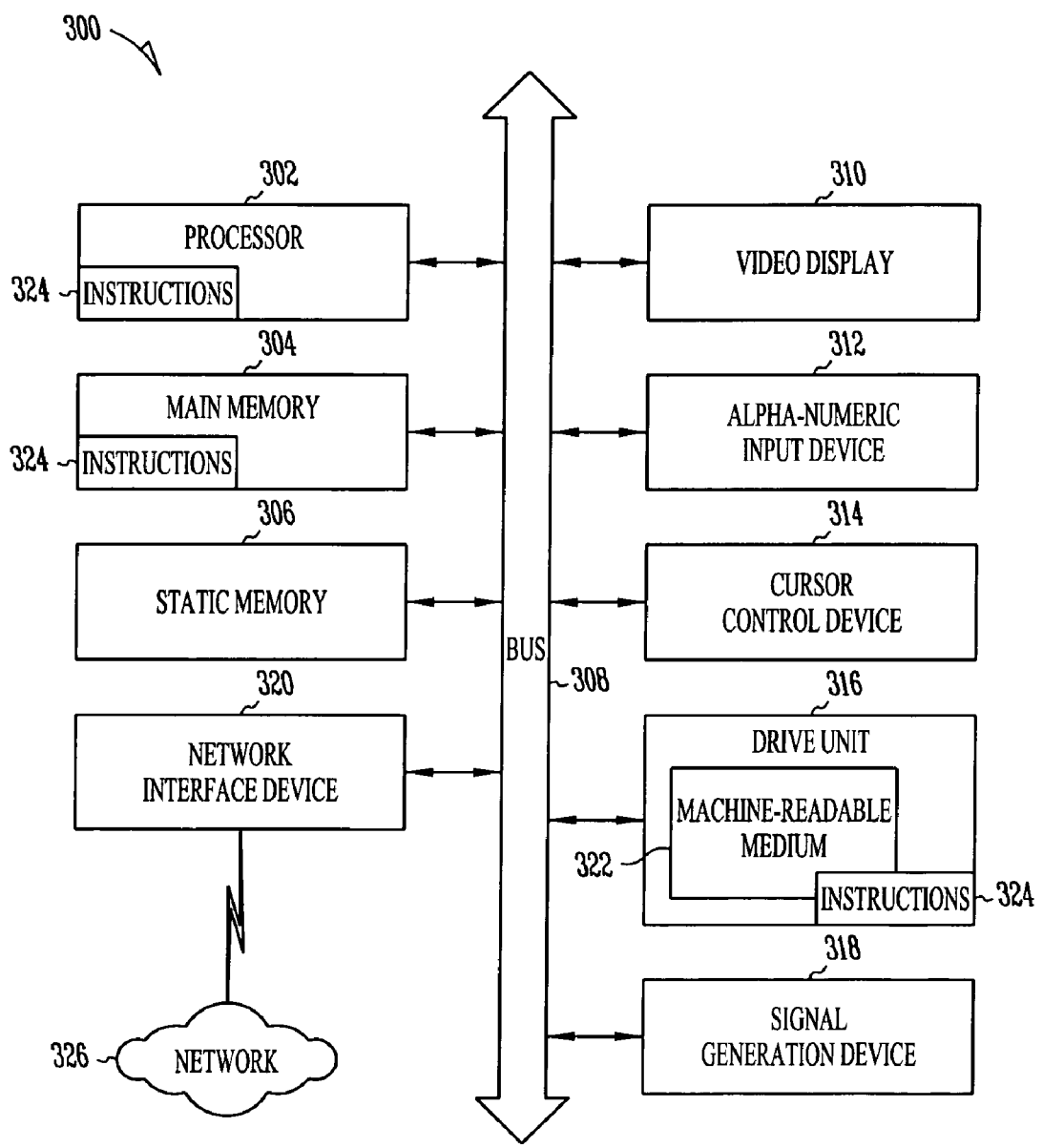
FIG. 11 illustrates a diagrammatic representation of a machine, according to an exemplary embodiment of the present invention, for implementing any one or more of the methods described herein.

FIG. 11 illustrates a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to facilitate spiral conveyance has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A conveyor system including:
   a rotatably-mounted drum having a bottom surface;
   a conveyor belt including a conveying surface that is movable along a path that includes a helical portion around the drum such that, during movement of the conveyor belt, a surface of the drum frictionally engages an inside edge of the conveyor belt along the helical portion of the path; and
   a rotating driving element, a peripheral surface of the rotating driving element to directly engage the drum and to rotate the drum thereby operatively to move the conveyor belt along the path, the rotating driving element including a roller defining the peripheral surface to directly engage the bottom surface of the drum with a frictional engagement to rotate the drum.

2. The system of claim 1, wherein the roller is vulcanized with polyurethane to increase the frictional engagement between the roller and the drum.

3. The system of claim 1, wherein the drum is shaftless.

4. The system of claim 1, wherein the roller is tapered to maintain the same velocity at a plurality of contact points between the peripheral surface of the roller and the bottom surface of the drum.

5. The system of claim 1, wherein the roller is positioned under the drum to hold the drum in a vertical position and reduce horizontal load on an external frame that supports the belt.

6. A conveyor system including:
   a rotatably-mounted drum without a center shaft;
   a conveyor belt including a conveying surface that is movable in a path that includes a helical portion around the drum such that, during movement of the conveyor belt a surface of the drum frictionally engages an inside edge of the conveyor belt along the helical portion of the path; and
   a rotating driving element to directly engage the drum and to rotate the drum, thereby operatively to move the conveyor belt along the path, the rotating driving element including a roller to directly engage the drum with a frictional engagement to rotate the drum.

7. The system of claim 6, wherein the drum includes at least one of an outside bottom surface, an outside top surface, and an outside cylinder surface and the rotating driving element directly engages at least one of the outside bottom surface, the outside top surface, and the outside cylinder surface.

8. The system of claim 6, wherein the rotating driving element includes a peripheral surface that directly engages the drum.

* * * * *